United States Patent [19]

Shirota et al.

[11] Patent Number: 4,769,781
[45] Date of Patent: Sep. 6, 1988

[54] IC DEVICE COMPATIBLE WITH INPUT SIGNALS IN THE FORMATS FOR TWO-LINE AND FOUR-LINE TYPE BUS LINES

[75] Inventors: Norihisa Shirota; Shinji Takada, both of Kanagawa; Kazuo Yamagiwa, Tokyo, all of Japan

[73] Assignee: Sony Corporation, Tokyo, Japan

[21] Appl. No.: 925,374

[22] Filed: Oct. 30, 1986

[30] Foreign Application Priority Data

Nov. 5, 1985 [JP] Japan .................................. 60-247551

[51] Int. Cl.⁴ ...................... G06F 13/38; G06F 13/00
[52] U.S. Cl. ................................................. 364/900
[58] Field of Search ... 364/200 MS File, 900 MS File; 357/40; 370/85, 67

[56] References Cited

U.S. PATENT DOCUMENTS

| | | | |
|---|---|---|---|
| 4,174,536 | 11/1979 | Misunas et al. | 364/200 |
| 4,306,298 | 12/1981 | McElroy | 364/900 |
| 4,309,754 | 1/1982 | Dinwiddie, Jr. | 364/200 |
| 4,449,202 | 5/1984 | Knapp et al. | 364/900 |

OTHER PUBLICATIONS

Serial Data Controller (SDC) P/N 10930, Rockwell Parallel Processing System (PPS) product description, Document No. 10930, N40, Jul. 1975.

*Primary Examiner*—Eddie P. Chan
*Attorney, Agent, or Firm*—Alvin Sinderbrand

[57] ABSTRACT

An IC device has a first terminal for inputting date in the format for a four-line or two-line type bus line, and for outputting data, a second terminal for receiving a chip select signal, a third terminal for receiving a clock pulse, a fourth terminal for outputting data a first signal processor for receiving data from the first terminal in the format for a two-line type bus line and including an address signal and for outputting the data such first signal processor including a detector for detecting the address signal, a second signal processor for receiving the data supplied from the first terminal in the format of a four-line type bus line and outputting the data to the fourth terminal, the first and second signal processors being selectively enabled in accordance with the chip select signal, and a control unit for receiving the signal from the first or second signal processor and outputting the data to the first terminal or the first or second signal processors.

15 Claims, 7 Drawing Sheets

IC DEVICE COMPATIBLE WITH INPUT SIGNALS IN THE FORMATS FOR TWO-LINE AND FOUR-LINE TYPE BUS LINES

BACKGROUND OF THE INVENTION

1. Field of the Invention

The present invention relates to an IC device applicable to electronic equipment, such as, a television receiver, VTR, tape recorder, or the like, having a digitally controlled internal circuit and, more particularly, is directed to an IC device suitable as a CPU or a microprocessor having a communication line.

2. Description of the Prior Art

Figure 1:
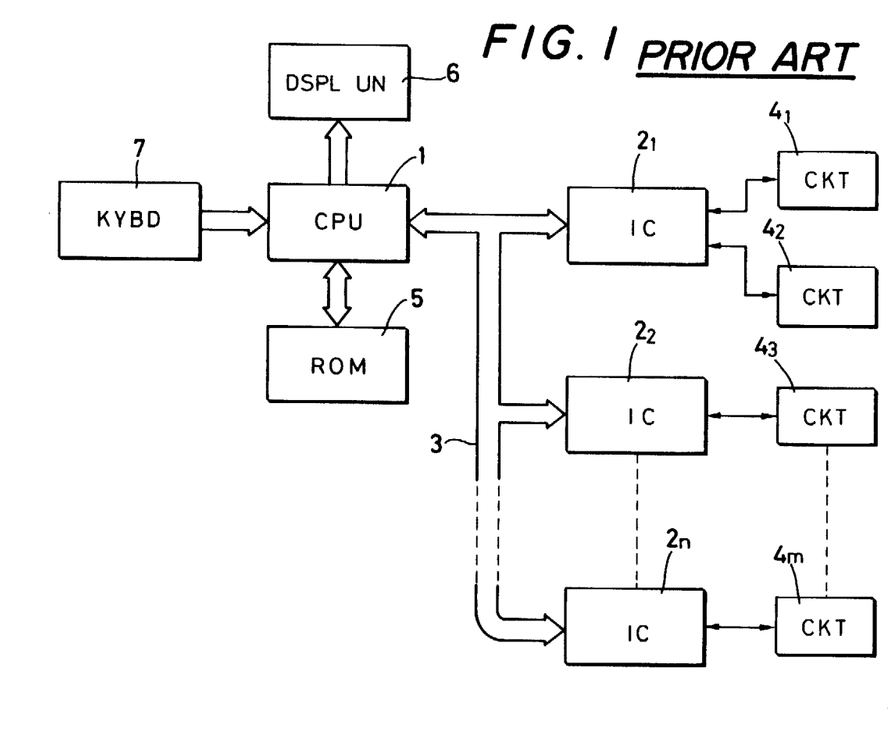
FIG. 1 is a block diagram of a prior art control system using a conventional inner bus line.

Most video and audio equipment, such as, television receivers, VTRs, tape recorders, or the like, which have a digital circuit employ an inner bus system, for example, as shown in FIG. 1, in which a main CPU 1 and a plurality of IC devices $2_1, 2_2, \ldots,$ and $2_n$ are connected to each other through a bus line 3, and the IC devices $2_1, 2_2, \ldots, 2_n$ control circuits $4_1, 4_2, \ldots,$ and $4_m$. The IC devices $2_1$ to $2_n$ fetch predetermined data from data supplied by CPU 1, D/A-convert the fetched data, and use the resulting analog signals to control circuits $4_1$ to $4_m$. At the same time, IC devices $2_1$ to $2_n$ receive and A/D-convert operation voltages from circuits $4_1$ to $4_m$, and supply the obtained digital signals to CPU 1. As a result, IC devices $2_1$ to $2_n$ function as a slave CPU.

Further, in FIG. 1, a ROM 5 stores set values of the operation voltage of circuits $4_1$ to $4_m$. In normal operation, a set value is read from ROM 5 by CPU 1 and the readout data is supplied to IC devices 2 to $2_n$ through bus line 3, so that circuits $4_1$ and $4_m$ are controlled to perform predetermined operations while a display unit 6 provides a suitable display, for example, an indication that such operations are being performed. The circuits $4_1$ to $4_m$ are also externally controlled by manual actuation of a keyboard 7, or by a remote control system, through CPU 1.

Figure 2:
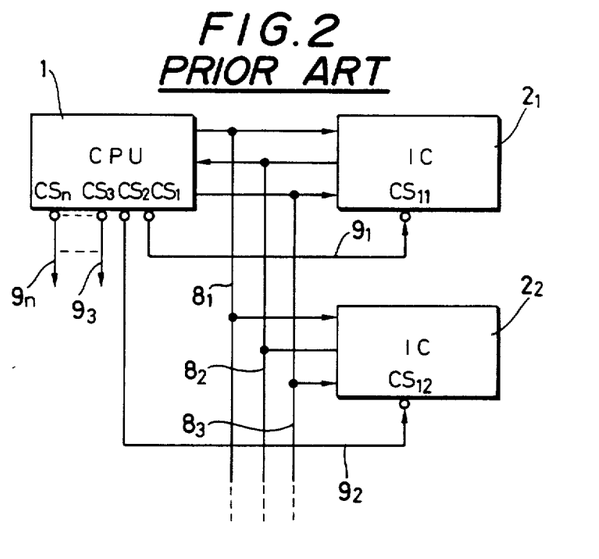
FIG. 2 is a block diagram of a portion of the prior art control system when using a conventional four-line type bus line.

As shown on FIG. 2, four-line type buses have been usually used as the bus line 3 in an inner bus system of the type shown on FIG. 1. However, recently, two-line type buses have been coming into use for that purpose, as shown on FIG. 3.

More particularly, in the four-line type bus arrangement shown on FIG. 2, CPU 1 and IC devices $2_1, 2_2, \ldots 2_n$ are connected in common through three lines $8_1, 8_2,$ and $8_3$. Chip select terminals $CS_1, CS_2, \ldots CS_n$ of CPU 1 and chip select terminals $CS_{11}, CS_{12}, CS_{1n}$ of the IC devices $2_1, 2_2, \ldots 2_n,$ are connected to each other through lines $9_1, 9_2, \ldots 9_n,$ respectively. When CPU 1 selectively communicates with IC device $2_1$, it supplies a chip select signal of "L" level from terminal $CS_1$ to the respective terminal $CS_{11}$, and a signal of "H" level from terminals $CS_2, \ldots CS_n$ to the terminals $CS_{12}, \ldots CS_{1n}$ of the other IC devices $2_2, \ldots 2_n$. The line $8_1$ transmits data from CPU 1 to IC devices $2_1, 2_2, \ldots 2_n$, the line $8_2$ transmits data from the IC devices $2_1, 2_2, \ldots 2_n$ to CPU 1, and line $8_3$ transmits a clock pulse from CPU 1 to IC devices $2_1, 2_2, \ldots 2_n$. Shift registers (not shown) are provided in the IC devices $2_1, 2_2, \ldots 2_n$. When a chip select signal is supplied to the IC devices $2_1, 2_2, \ldots 2_n$ for selecting one of those IC devices, data supplied from CPU 1 through the line $8_1$ is fetched by the shift registers of the selected IC device. The shift registers also supply data stored therein to the CPU 1 through the line $8_2$.

Figure 3:
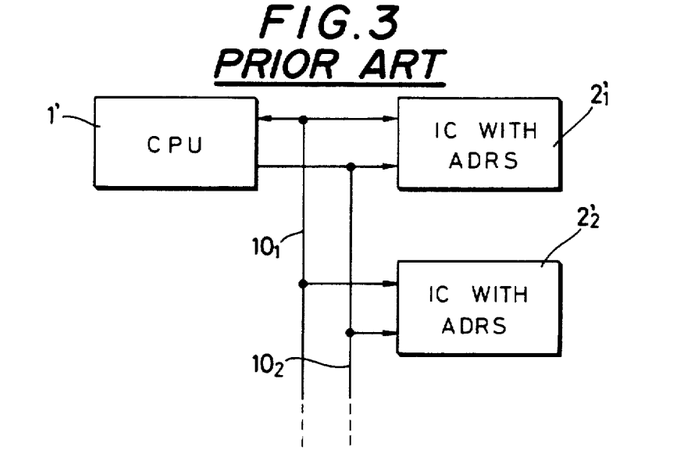
FIG. 3 is a block diagram of a portion of the prior art control system when using a conventional two-line type bus line.

Referring in detail to FIG. 3, it will be seen that when the two-line type bus line is used in the arrangement of FIG. 1, CPU 1' and IC devices $2'_1, 2'_2, \ldots 2'_n$ are connected in common through two lines $10_1$ and $10_2$. In this case, line $10_1$ is used for alternately transmitting and receiving serial data between CPU 1' and IC devices $2'_1, 2'_2, \ldots 2'_n$, and line $10_2$ is used for transmitting a clock pulse. Specific addresses are assigned to IC devices $2'_1, 2'_2, \ldots 2'_n$, which selectively fetch the data when they detect their respective addresses in the data supplied from CPU 1'. A communication system using the two-line type bus line is disclosed in detail in Japanese Patent Disclosure No. 57-106262.

The two-line type bus line is advantageous in that it reduces the number of wires required, as compared with the four-line type bus line. On the other hand, the four-line type bus line can transmit a large amount of data within a short period of time, that is, the two-line type bus line has a relatively slower transmission speed. Accordingly, the four-line type bus line has been used for equipment, such as, a VTR, which requires complex control functions, while the two-line type bus line has been used in those applications where the controlled equipment, for example, a television receiver, involves relatively simpler control functions. In connection with the foregoing, it is to be noted that, in a VTR, various predetermined circuits, such as a timer circuit, a display circuit, a drive mechanism, a servo circuit, and the like, must be monitored sequentially and constantly within a one-field period of a video signal. It has been found that such monitoring and consequent control cannot be performed within a one-field period when using a two-line type bus line by reason of the relatively slower transmission speed of that type of bus line.

Figure 4A:
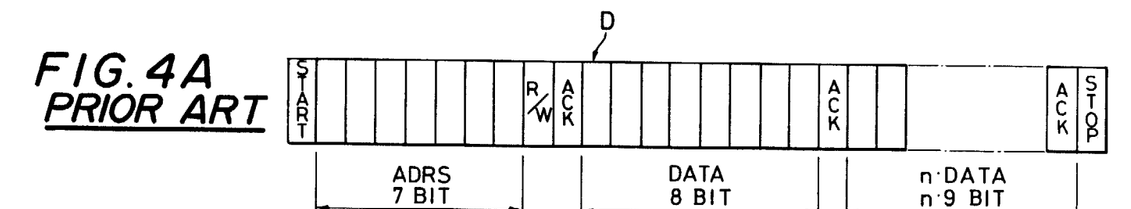
FIGS. 4A-4C show a format for the data transmitted by the two-line type bus line of FIG. 3.
Figure 4B:
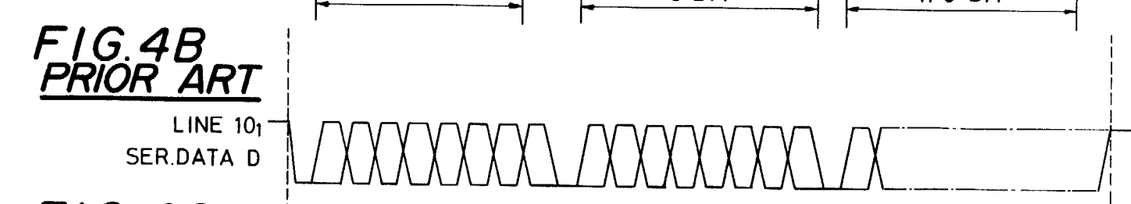
Figure 4C:
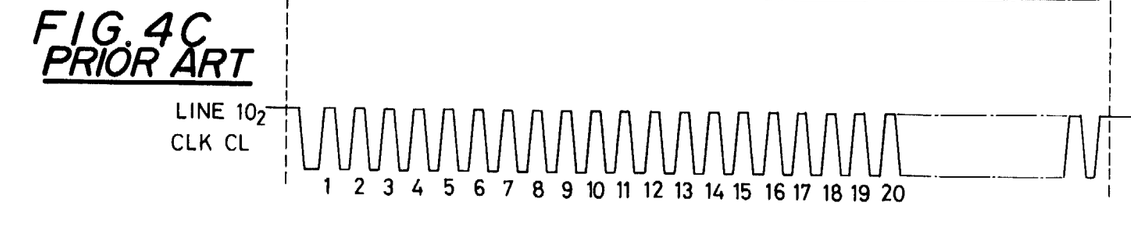

Referring now to FIGS. 4A-4C showing the data format of the signals transmitted by the two-line type bus line of FIG. 3, it will be seen that line $10_1$ transmits serial data D (FIG. 4B) and the other line $10_2$ transmits a clock CL (FIG. 4C). The data D is shown on FIG. 4A to comprise a 1-bit start signal, a 7-bit address signal for designating the address assigned to one of the IC devices $2'_1, 2'_2, \ldots 2'_n$, a 1-bit R/W signal for determining whether to supply data to the designated IC device or to fetch data from the designated IC device, a 1-bit acknowledge or ACK signal which is sent to the CPU 1' when it is confirmed that an IC device is designated and that such IC device has received data, an 8-bit data signal representing a control level or the like, n 9-bit data signals, and a 1-bit stop signal.

It will be appreciated that the IC devices $2_1, 2_2, \ldots 2_n$ used in connection with the four-line type bus line in FIG. 2 and the IC devices $2'_1, 2'_2, \ldots 2'_n$ used in connection with the two-line type bus line in FIG. 3 have different arrangements and thus are not generally compatible with each other. However, in order to realize the above-described advantages of the both types of bus lines, it is sometimes desirable to use an IC device for the two-line type bus lines in a system using the four-line type bus lines. Further, it may be desirable to combine a VTR using a four-line type bus line and a television receiver using a two-line type bus line in a system which is controlled by a main CPU common to both the VTR and television receiver.

OBJECTS AND SUMMARY OF THE INVENTION

It is a principal object of the present invention to provide an IC device which can be used with both four- and two-line type buses.

It is another object of the present invention to provide an IC device which is adapted for use in a control system having a four-line type bus line, and wherein data having a format for a two-line type bus line is transmitted, thereby allowing high-speed communication.

It is a further object of the present invention to provide an IC device which is adapted for use in a control system using a four-line type bus line, together with an IC device for a two-line type bus line, so that the number of wires can be decreased.

In accordance with an aspect of this invention, an IC device is provided with a first terminal for inputting data of first and second types or formats and for outputting data, a second terminal for receiving a chip select signal, a third terminal for receiving a clock pulse, a fourth terminal for outputting data, first signal processing means for receiving data supplied from the first terminal and outputting data to the first terminal, second signal processing means for receiving data supplied from the first terminal and outputting data to the fourth terminal, control means for receiving data from the first or second signal processing means and outputting the data to the first terminal or to the first or second signal processing means, and means for selectively enabling one of the first and second signal processing means in accordance with the type or format of the data input to said first terminal.

The above, and other objects, features and advantages of the invention, will be apparent in the following detailed description of illustrative embodiments to be read in connection with the accompanying drawings in which corresponding parts or components are identified by the same reference numerals in the several views.

DESCRIPTION OF THE PREFERRED EMBODIMENTS

Figure 5:
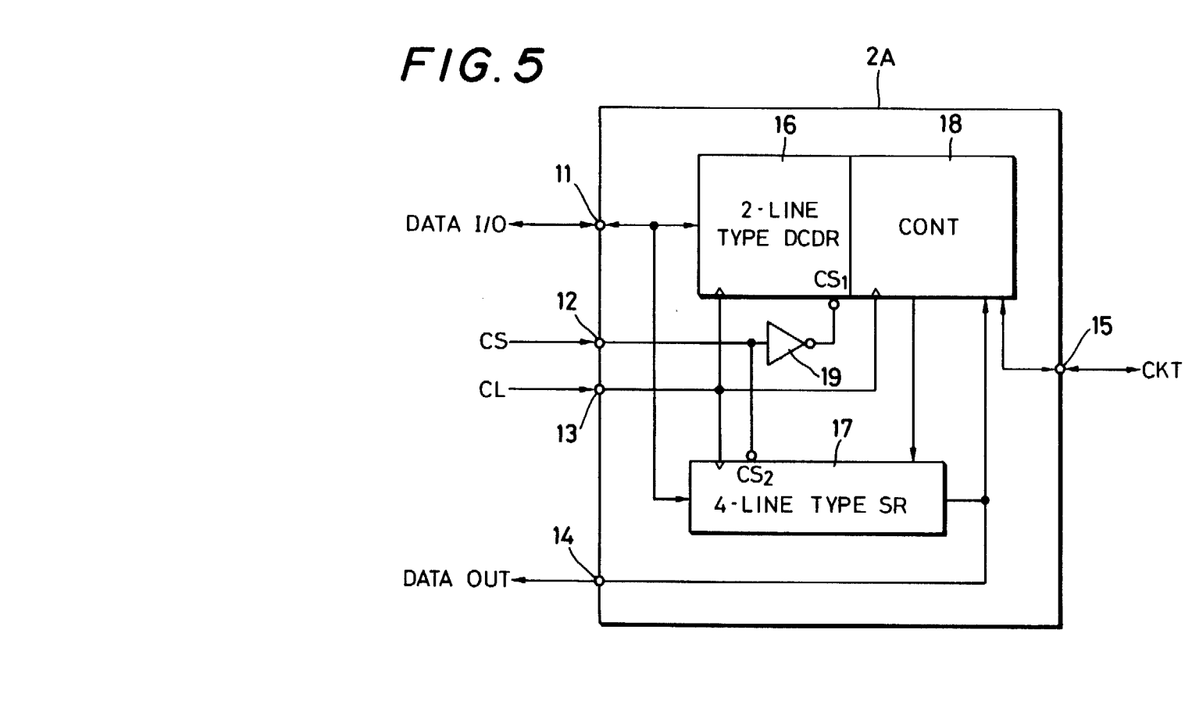
FIG. 5 is a block diagram of an IC device according to a first embodiment of the present invention.

Referring first to FIG. 5, it will be seen that an IC device 2A according to a first embodiment of the present invention, as there illustrated, is intended for incorporation in a control system using the four-line type bus line described with reference to FIG. 2. In this embodiment, the IC device 2A can operate even when a signal having a data format for the two-line type bus line shown in FIG. 4A is supplied from a main CPU 1 onto the bus line.

The IC device 2A is shown to have a data input/output terminal 11, an input terminal 12 for a chip select signal CS, an input terminal 13 for a clock pulse CL, a data output terminal 14, and a connection terminal 15 for connecting a circuit to be controlled, for example, any of circuits $4_1$ to $4_m$ shown in FIG. 1. The IC device 2A also includes a decoder 16 for a signal of a two-line type bus line, a shift register 17 for a signal of a four-line type bus line, a controller 18, and an inverter 19. The chip select signal CS applied to terminal 12 is supplied therefrom directly to a chip select terminal $CS_2$ of shift register 17, and, after being inverted by inverter 19, is applied to a chip select terminal $CS_1$ of decoder 16. Therefore, either decoder 16 or shift register 17 is selectively enabled by the chip select signal CS. In the first embodiment being now described, the IC device 2A is operated by a signal having a data format of the two-line type bus line when the signal CS is at "H" level, that is, decoder 16 is enabled in response to such signal CS.

The clock pulse CL applied to terminal 13 is supplied therefrom to decoder 16, shift register 17, and controller 18. The controller 18 generates a control signal which is output at terminal 15 for controlling the controlled circuit $4_1 \ldots 4_m$ on the basis of data supplied from decoder 16 or shift register 17. The controller 18 also receives an operation voltage from the controlled circuit $4_1 \ldots 4_m$ through terminal 15, and generates data corresponding to such operation voltage for output from terminal 11 or for setting of such data in shift register 17. The controller 18 may include a predetermined logic circuit, and the like. It will be appreciated that a predetermined address is assigned to IC device 2A.

With the above arrangement, when a signal CS of "L" level is applied to terminal 12, shift register 17 is enabled and decoder 16 is disabled, with the result that IC device 2A is set in the four-line type mode. With IC device 2A in such mode, a signal for the four-line type bus line is input to terminal 11 from the main CPU, fetched by shift register 17, and transferred to controller 18 in response to clock pulse CL. The controller 18 generates a control signal based on this signal for the four-line type bus line and supplies the control signal through terminal 15 in order to control the respective controlled circuit. The controller 18 also generates data corresponding to the operation voltage received from the controlled circuit through terminal 15 and supplies that data to shift register 17, as needed. This data corresponding to the operation voltage from the controlled circuit is read out by clock pulse CL and is supplied to the CPU through terminal 14.

When a signal CS of "H" level is applied to terminal 12, decoder 16 is enabled, and shift register 17 is disabled, so that IC device 2A is placed in its two-line type mode. Data having a two-line type data format, as shown on FIG. 4A, is supplied to terminal 11 from the CPU and is applied therefrom to decoder 16 together with clock pulse CL. Decoder 16 fetches this data when it detects the respective address at the beginning thereof. The controller 18 generates a control signal based on the data fetched by decoder 16 and supplies the control signal to the controlled circuit though terminal 15. The controller 18 also generates data corresponding to the operation voltage of the controlled circuit received at terminal 15 and sends the operation voltage data to the CPU through terminal 11, as needed.

As described above, IC device 2A can be operated by a signal having the data format for a four-line type bus line or a two-line type bus line. When a plurality of the IC devices 2A are provided, they are connected to the CPU through a four-line type bus line, as shown on FIG. 2, so that a control system can be constituted according to the present invention. In such control system, addresses are assigned to the respective IC devices so that any one of the IC devices 2A to be controlled can also be selected in the two-line type mode. Alternatively, in the four-line type mode, any one of the IC devices 2A to be controlled can be selected by the chip select signal CS.

Figure 6:
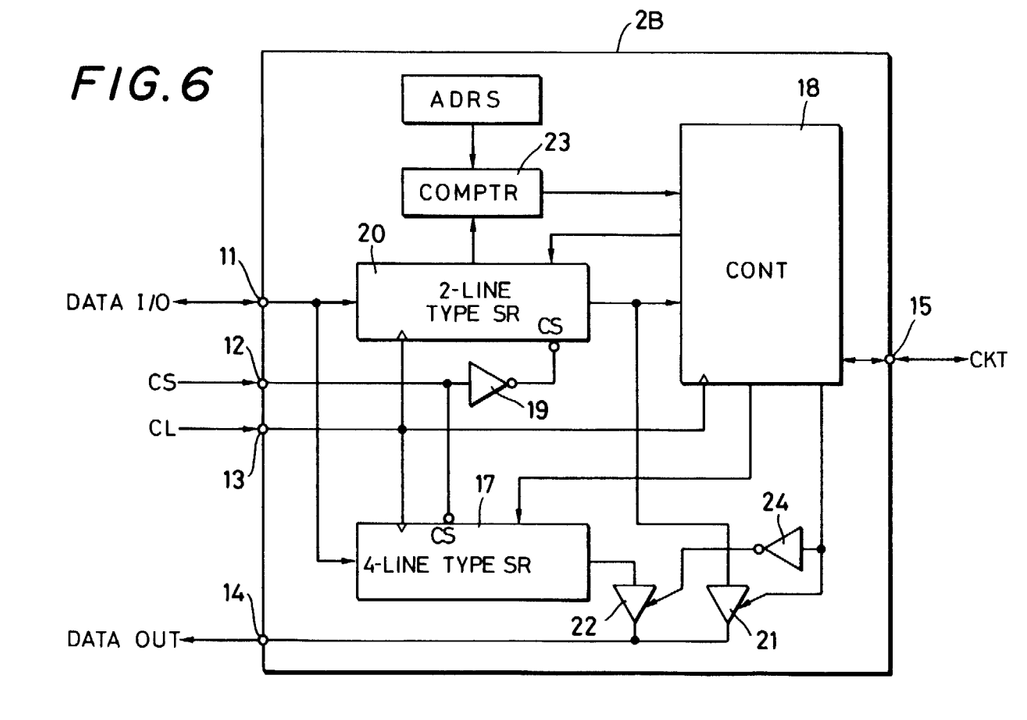
FIG. 6 is a block diagram of an IC device according to a second embodiment of the present invention.

FIG. 6 shows an IC device 2B according to a second embodiment of the present invention, and in which elements corresponding to those described with reference to FIG. 5 are identified by the same reference numerals.

In the IC device 2A shown in FIG. 5, the terminal 14 is not used in the two-line type mode so that one bus line is left unused. In contrast to the foregoing, even when IC device 2B is used in the two-line type mode, data is input from terminal 11 and data is output from terminal 14. For this purpose, a two-line type shift register 20 is provided as the signal processor of the data in the format of a two-line type bus line, and output data therefrom is applied to terminal 14 through a two-line type gate 21. Further, output data from the shift register 17 is applied to terminal 14 through a four-line type gate 22. When IC device 2B operates in the two-line type mode, shift register 20 is enabled by the chip select signal CS at the "H" level through an inverter 19 and shift register 17 is disabled. The address added to the data in the format of a two-line type bus line input to shift register 20 from terminal 11 is compared in a comparator 23 with the address assigned to IC device 2B. When coincidence is established in comparator 23, controller 18 outputs a gate signal in response to the coincidence signal. Such gate signal enables gate 21 and disables gate 22 through an inverter 24. Then, the shift register 20 can send the data, received from controller 18, to the CPU through gate 21 and terminal 14.

When the chip select signal CS is set at the "L" level so that the IC device 2B is set in the four-line type mode, shift register 17 is enabled and gates 21 and 22 are disabled and enabled, respectively, so that data output from shift register 17 is supplied through the terminal 14 to the CPU.

Figure 7:
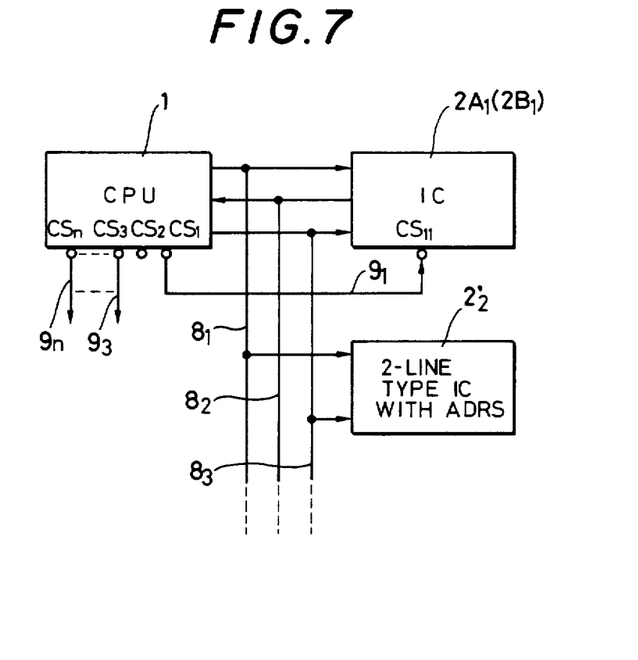
FIG. 7 is a block diagram of a control system using a four-line type bus line and which incorporates an IC device according to this invention and also a conventional two-line type IC device.

When a plurality of the IC devices 2A or 2B according to the invention are used to constitute a control system as shown in FIG. 1 with a four-line type bus line, conventional IC devices of a type intended for a two-line type bus line (FIG. 3) are often also included, for example, as shown at 2'$_2$ in FIG. 7.

The IC device 2'$_2$ for the two-line type bus line as used in FIG. 7 may be of the type described with reference to FIG. 3. The other IC devices 2A$_1$ or 2B$_1$ may be of the kind described with reference to FIG. 5 or 6. The IC device 2'$_2$ is shown connected to a data input/output line 8$_1$ and a clock line 8$_3$, and is not connected to a data output line 8$_2$. Since no chip select terminal is provided on IC device 2'$_2$, no chip select signal is supplied thereto from CPU 1. Therefore, IC device 2'$_2$ communicates with CPU 1 when its respective identifying address is designated by CPU 1. However, when the bus line is used in the four-line type mode, IC device 2'$_2$ cannot detect that fact since chip selection is not performed with respect to IC device 2'$_2$. As a result, IC device 2'$_2$ may erroneously output a signal at an arbitrary time when another IC device communicates with CPU 1. If such erroneous output signal is supplied from IC device 2'$_2$ to line 8$_1$, it is mixed with a signal from another IC device which is intended to be operative, thus interfering with communication.

In order to solve this problem, a specific code, for example, the code "0000010" may be provided as the 7-bit address signal in the data D format shown on FIG. 4 whenever a signal having a data format for a type of bus line other than the two-line type bus line is to be supplied. In such case, the IC device 2'$_2$ detects the specific address "0000010" and is made inoperative in response thereto. On the other hand, the IC device 2A or 2B is set in the four-line type mode in response to the chip selection signal CS supplied thereto after the address or code "0000010" is detected. Of course, an address or code other than "0000010" can be used as the specific address or code for deactivating each conventional or two-line type IC device included in the system of FIG. 7.

Figure 8:
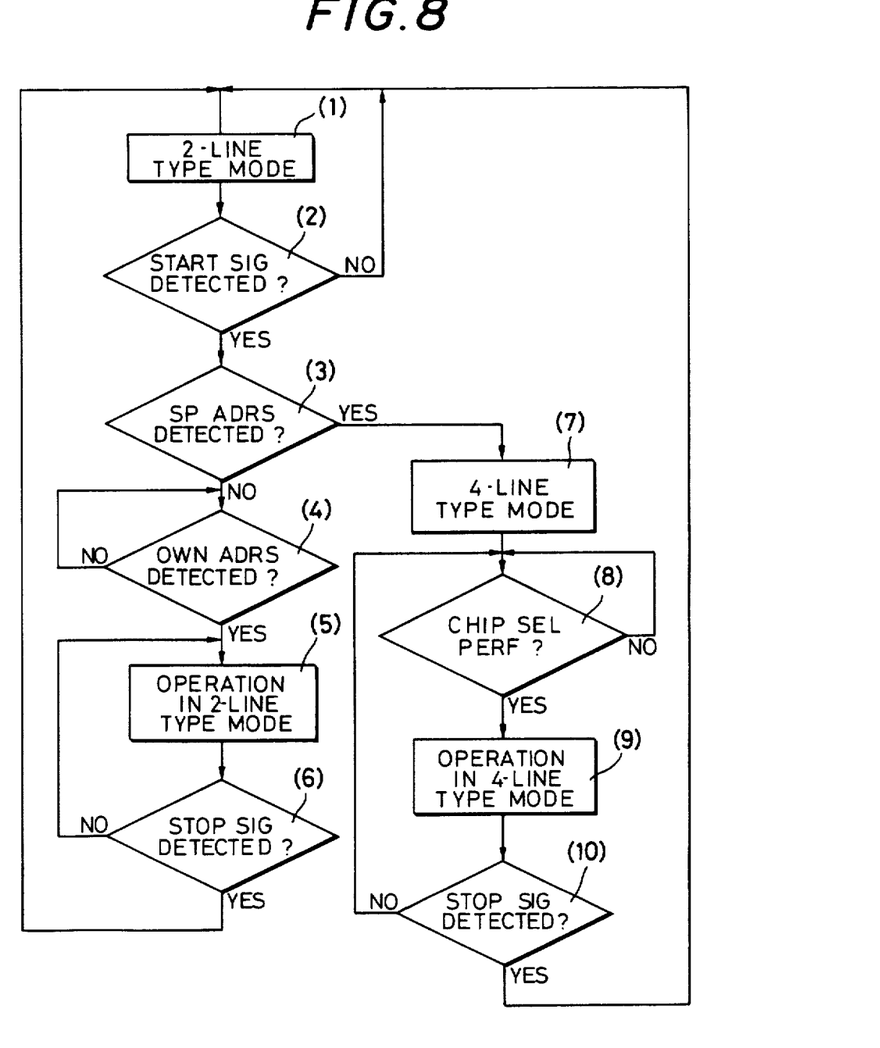
FIG. 8 is a flow chart showing operations of the IC device according to the present invention.

Referring now to FIG. 8, the operations of an IC device 2A or 2B according to this invention in the control system of FIG. 7 will be described with reference thereto for the case where the special code or address "0000010" is used to render inoperative any other IC devices in the system intended for operation only in the two-line type mode.

First, assume that the two-line type mode is set in step (1), and the IC device 2A or 2B awaits a start signal in step (2). When the start signal is detected, it is checked in step (3) whether specific code or address "0000010" is present. If the code "0000010" is not detected in step (3), that is, the input data is in the format for a two-line type bus line, the flow advances to step (4) to check if the address of the respective IC device 2A or 2B is received. If the respective address is detected in step (4), the IC device 2A or 2B performs a respective operation in the two-line type mode in step (5). When a stop signal is detected in step (6), the communication ends and the flow returns to step (1).

If the special address or code "0000010" is detected in step (3), the flow advances to step (7) to set the IC device 2A or 2B in the four-line type mode, and then it is checked in step (8) whether chip selection is performed. If chip selection occurs in step (8), the respective operation is performed in the four-line type mode in step (9). Then, it is checked in step (10) whether a stop signal is detected. If the stop signal is detected in step (10), the communication ends and the flow returns to step (1).

It will be appreciated that either four- or two-line type bus lines can be employed with a common IC device according to this invention. When an IC device according to the invention is incorporated in a control system using a four-line type bus line and data having the format for a two-line type bus line is transmitted, relatively high-speed communication is possible. In the case of a VTR, when a conventional two-line type bus line is used, the time required for monitoring and controlling the various circuits, such as, the timer, display, drive and servo circuits, exceeds one-field period (16.7 msec). However, when a four-line type bus line is used, this control time can be reduced to 3 msec, which is well within one-field period. Thus, other control functions can be performed utilizing the time made available by this time reduction. When a two-line type IC device is present in a system using a four-line type bus line, a chip select line extending between the CPU and the IC device can be omitted, thereby reducing the number of wires required.

Although specific embodiments of the invention have been described in detail herein with reference to the accompanying drawings, it is to be understood that the invention is not limited to those specific embodiments, and that various changes and modifications may be effected therein by one skilled in the art without departing from the scope or spirit of the invention as defined in the appended claims.

What is claimed is:

1. An IC device compatible with data of first and second types having respective formats adapted for bus means for first and second types, said device comprising:
    a first terminal for inputting data of said first and second types and for outputting data of said first type;
    a second terminal for receiving a clock pulse;
    a third terminal for outputting data of said first and second types;
    first signal processing means for processing data of said first type and receiving data of said first type supplied from said first terminal and outputting output data of said first type to one of said first terminal and said third terminal;
    second signal processing means for processing data of said second type and receiving data of said second type supplied from said first terminal and outputting output data of said second type to said third terminal;
    said first and second signal processing means receiving said clock pulse from said second terminal;
    control means for receiving said clock pulse and data from an enabled one of said first and second signal processing means and outputting control data corresponding to an operation voltage to selected ones of said first terminal and the enabled one of said first and second signal processing means; and
    means connected to said first and second signal processing means for selectively enabling one of said first and second signal processing means in accordance with the type of data input to said first terminal.

2. An IC device according to claim 1; further comprising a chip select terminal for receiving a chip select signal, wherein said chip select signal indicates said type of data input to said first terminal, and said means for selectively enabling supplies said chip select signal to said first and second signal processing means for thereby selectively enabling one of said signal processing means.

3. An IC device according to claim 1; wherein said first signal processing means includes detecting means for detecting an address signal included in the data input to said first terminal.

4. An IC device according to claim 1; further comprising a fourth terminal for connection to an external circuit; and in which said control means is operable to supply a control signal to said external circuit through said fourth terminal.

5. An IC device according to claim 4; in which said control means is operative to receive a signal from said external circuit through said fourth terminal.

6. An IC device according to claim 1; wherein data output from said control means is supplied to said first terminal through said first signal processing means.

7. An IC device according to claim 6; wherein said first signal processing means includes a decoder.

8. An IC device according to claim 7; wherein said second signal processing means includes a shift register.

9. An IC device according to claim 1; wherein said first and second signal processing means include first and second shift registers, respectively.

10. An IC device according to claim 9; wherein data output from said control means is supplied to said third terminal selectively through said first and second shift registers.

11. An IC device according to claim 10; further comprising first and second gate means selectively gated by said control means for transmitting data output from said first and second shift registers, respectively, to said third terminal.

12. An IC device according to claim 1; further comprising a chip select terminal for receiving a chip select signal and means for detecting a specific address included in the data input to said first terminal; and wherein said second signal processing means is connected to receive said chip select signal and is operated thereby when said specific address is detected.

13. An IC device according to claim 12; wherein said specific address is incorporated in a data format of a signal transmitted by a two-line type bus line.

14. An IC device compatible with data of first and second types having respective formats adapted for bus means for first and second types, said device comprising:
    a first terminal for inputting data of said first and second types and for outputting data of said first type;
    a second terminal for receiving a clock pulse;
    a third terminal for outputting data of said second type;
    first signal processing means for processing data of said first type and receiving data of said first type supplied from said first terminal and outputting output data of said first type to said first terminal;
    second signal processing means for processing data of said second type and receiving data of said second type supplied from said first terminal and outputting output data of said second type to said third terminal;
    said first and second signal processing means receiving said clock pulse from said second terminal;
    control means for receiving said clock pulse and data from an enabled one of said first and second processing means outputting control data corresponding to an operation voltage to selected ones of said first terminal and the enabled one of said first and second signal processing means; and
    means connected to said first and second signal processing means for selectively enabling one of said first and second processing means in accordance with the type of data input to said first terminal.

15. An IC device compatible with data of first and second types having respective formats adapted for bus means of first and second types, said device comprising:
    a first terminal for inputting data of said first and second types;

a second terminal for receiving a clock pulse;

a third terminal for outputting data of said first and second types;

first signal processing means for processing data of said first type and receiving data of said first type supplied from said first terminal and outputting output data of said first type to said third terminal;

second signal processing means for processing data of said second type and receiving data of said second type supplied from said first terminal and outputting output data of said second type to said third terminal;

said first and second signal processing means receiving said clock pulse from said second terminal;

control means for receiving said clock pulse and data from an enabled one of said first and second signal processing means and outputting control data corresponding to an operation voltage to selected ones of said first terminal and the enabled one of said first and second signal processing means; and means connected to said first and second signal processing means for selectively enabling one of said first and second signal processing means in accordance with the type of data input to said first terminal.

* * * * *